(12) United States Patent
Wisniewski

(10) Patent No.: US 11,469,549 B2
(45) Date of Patent: Oct. 11, 2022

(54) DECOUPLED ALIGNMENT SHROUD FOR VARIABLE CONNECTOR ROUTING

(71) Applicant: Vitesco Technologies USA, LLC, Auburn Hills, MI (US)

(72) Inventor: Andrew Joseph Wisniewski, South Lyon, MI (US)

(73) Assignee: Vitesco Technologies USA, LLC, Auburn Hills, MI (US)

( * ) Notice: Subject to any disclaimer, the term of this patent is extended or adjusted under 35 U.S.C. 154(b) by 397 days.

(21) Appl. No.: 16/655,980

(22) Filed: Oct. 17, 2019

(65) Prior Publication Data

US 2020/0119325 A1    Apr. 16, 2020

Related U.S. Application Data

(62) Division of application No. 15/386,745, filed on Dec. 21, 2016, now Pat. No. 10,483,514.

(60) Provisional application No. 62/312,461, filed on Mar. 24, 2016.

(51) Int. Cl.
    *H01R 13/629* (2006.01)
    *H01R 13/645* (2006.01)
    *H01M 50/50* (2021.01)

(52) U.S. Cl.
    CPC .......... *H01R 13/629* (2013.01); *H01M 50/50* (2021.01); *H01R 13/6456* (2013.01); *B60Y 2200/92* (2013.01); *B60Y 2410/115* (2013.01); *B60Y 2410/12* (2013.01); *H01M 2220/20* (2013.01); *H01R 2201/26* (2013.01); *Y10S 903/903* (2013.01)

(58) Field of Classification Search
    CPC .............. H01M 2/20; H01M 2220/20; H01R 13/6456; H01R 13/629; H01R 2201/26; B60L 11/18; Y10S 903/903; B60Y 2410/12; B60Y 2410/115; B60Y 2200/92
    USPC ........................................................ 429/121
    See application file for complete search history.

(56) References Cited

U.S. PATENT DOCUMENTS

| 2005/0032402 A1 | 2/2005 | Takanashi et al. |
| 2006/0046578 A1 | 3/2006 | Karadimas et al. |
| 2007/0298642 A1 | 12/2007 | Kameyama |

(Continued)

FOREIGN PATENT DOCUMENTS

| CN | 101512844 A | 8/2009 |
| CN | 103378434 A | 10/2013 |
| FR | 2602375 A1 | 2/1988 |

*Primary Examiner* — Gary D Harris

(57) ABSTRACT

A shroud configured to connect a leadframe to a battery system for a hybrid motor vehicle is provided. The shroud is removably attachable to the leadframe. The shroud has at least one shroud alignment feature, the shroud being removably attached to the leadframe in a predetermined orientation wherein the shroud alignment feature is aligned with a complimentary leadframe alignment feature. The shroud may include a hollow cylindrical portion and at least one connecting feature configured to attach the shroud to the leadframe. The shroud may be provided as part of a connector system that includes the leadframe. In this case, the leadframe is configured to provide an electrical and mechanical connection between a power inverter and the battery system of the electric motor. The leadframe includes at least one leadframe alignment feature that is aligned with the shroud alignment feature.

4 Claims, 12 Drawing Sheets

(56) References Cited

U.S. PATENT DOCUMENTS

2010/0015841 A1    1/2010   Bolik et al.
2013/0273781 A1   10/2013   Buck et al.
2015/0329174 A1*   11/2015   Inoue ................ H01M 10/6552
                                                                                                      429/71

* cited by examiner

DECOUPLED ALIGNMENT SHROUD FOR VARIABLE CONNECTOR ROUTING

CROSS REFERENCE TO RELATED APPLICATIONS

This U.S. patent application is a divisional of, and claims priority under 35 U.S.C. § 120 from, U.S. patent application Ser. No. 15/386,745, filed on Dec. 21, 2016, which claims priority under U.S.C. § 119(e) to U.S. Provisional Application 62/312,461, filed on Mar. 24, 2016. The disclosures of these prior applications are considered part of the disclosure of this application and are hereby incorporated by reference in their entireties.

TECHNICAL FIELD

The present disclosure relates to hybrid and electric vehicle systems, and more particularly, to mainframe/leadframe connectors for power inverters.

BACKGROUND

Government regulations and consumer desires demand that vehicles continuously improve on fuel economy and emissions. At the same time, vehicle affordability is a concern, in light of the numerous automotive requirements and increasing costs. Accordingly, there is a need for more fuel efficient and low-emission engines that are also without added complexity and cost.

Electrically powered and hybrid (conventionally fossil fuel power in combination with electrical power) vehicles are a viable solution for reducing emissions and improving fuel economy. Such vehicles are becoming increasingly attractive alternatives to fossil fuel powered cars. Electric and hybrid vehicles require high voltage applications having relatively large capacity battery systems with relatively large amounts of power compared to a 12 Volt (V) automobile storage battery. In addition, because of the high voltage requirements, significant safety concerns are raised.

The introduction of 48 Volt Ecodrive power supply systems provide a mild hybrid solution that is less costly and poses less of a safety risk, yet still provides for an improvement in gas mileage and a reduction in emissions. These systems can provide electronic start-stop features, as well as other advantages. Typically, a 48 volt system includes a 48 Volt power supply and a leadframe or mainframe that has a connector portion for connecting the leadframe to an electric motor/generator. The leadframe and the connector portion are each built specifically to fit the specifications of a particular vehicle.

Accordingly, there exists a need for a 48 Volt leadframe that is connectable within multiple vehicles without significant re-tooling.

SUMMARY

Disclosed is a system, apparatus, and method that decouples a connector shroud from a leadframe so that the connector shroud can be oriented in any desired direction with minimal changes to the tooling for producing the leadframe.

In one form, which may be combined with or separate from the other forms described herein, a connector system for a hybrid motor vehicle is provided. The connector system includes a leadframe configured to provide an electrical and mechanical connection between a power inverter and a battery system of an electric motor. The leadframe has at least one leadframe alignment feature. The system also includes a shroud that is configured to connect the leadframe to the battery system. The shroud is removably attached to the leadframe, and the shroud has at least one shroud alignment feature. The shroud is removably attached to the leadframe in a predetermined orientation wherein the at least one shroud alignment feature is aligned with the at least one leadframe alignment feature.

In another form, which may be combined with or separate from the other forms disclosed herein, a shroud is provided that is configured to connect a leadframe to a battery system of an electrical motor and that is removably attachable to the leadframe. The shroud comprises a hollow cylindrical portion and at least one shroud alignment feature configured to align the shroud with the leadframe in a predetermined orientation. At least one connecting feature is configured to attach the shroud to the leadframe.

In yet another form, which may be combined with or separate from the other forms disclosed herein, a method of forming a connector system for a hybrid motor vehicle is provided. The method includes a step of molding a connector shroud having a connector shroud alignment feature from a static connector shroud mold. The method also includes inserting an insert piece into a leadframe mold to define a leadframe alignment feature mold portion. Further, the method includes molding a leadframe having a leadframe alignment feature from the leadframe mold. The method also includes attaching the connector shroud to the leadframe in a predetermined orientation wherein the connector shroud alignment feature is aligned with the leadframe alignment feature.

The present disclosure also provides other optional features, in combination or separately, which include, but are not limited to the following: the shroud including at least one connecting feature attaching the shroud to the leadframe; the shroud having a wall shaped as a hollow cylinder, the wall defining an opening along a height of the wall; the at least one leadframe alignment feature including two leadframe slots, the at least one shroud alignment feature including two shroud slots, and each leadframe slot being aligned with a shroud slot to align the shroud with the leadframe; a bolt extending from the leadframe; the shroud defining a hollow interior within the wall, the bolt extending into the hollow interior; a power inverter electrically and mechanically connected to the leadframe; a battery system connector attached to the shroud; the at least one shroud alignment feature including a first shroud alignment feature disposed along a first line and a second shroud alignment feature disposed along a second line, the first and second lines having an angle of about 120 degrees therebetween as measured from a center of the shroud; the at least one leadframe alignment feature including a first leadframe alignment feature and a second leadframe alignment feature; the battery system connector having a first connector alignment feature aligned with the first shroud alignment feature and the first leadframe alignment feature; the battery system connector having a second connector alignment feature aligned with the second shroud alignment feature and the second leadframe alignment feature; the first leadframe alignment feature and the first connector alignment feature being disposed along the first line; the second leadframe alignment feature and the second connector alignment feature being disposed along the second line; the shroud being press fit to the leadframe; the shroud being clipped to the leadframe; the shroud wall defining a base portion disposed in a base portion plane; the at least one connecting feature including a plurality of connecting features extending from the base portion and beyond the base portion plane, the plurality of connecting features clipping the shroud to the leadframe; the method including forming the connector shroud including at least one connecting feature; and the method including attaching the connecting feature to the leadframe.

Further features and advantages of the present disclosure will become apparent from consideration of the following description and the appended claims, when taken in connection with the accompanying drawings. It should be understood that the description and specific examples are intended for purposes of illustration only and are not intended to limit the scope of the present disclosure.

BRIEF DESCRIPTION OF THE DRAWINGS

Examples are reflected in the drawings, which will be described below. The drawings described herein are for illustration purposes only and are not intended to limit the scope of the present disclosure in any way. The drawings show.

DETAILED DESCRIPTION

Figure 1A:
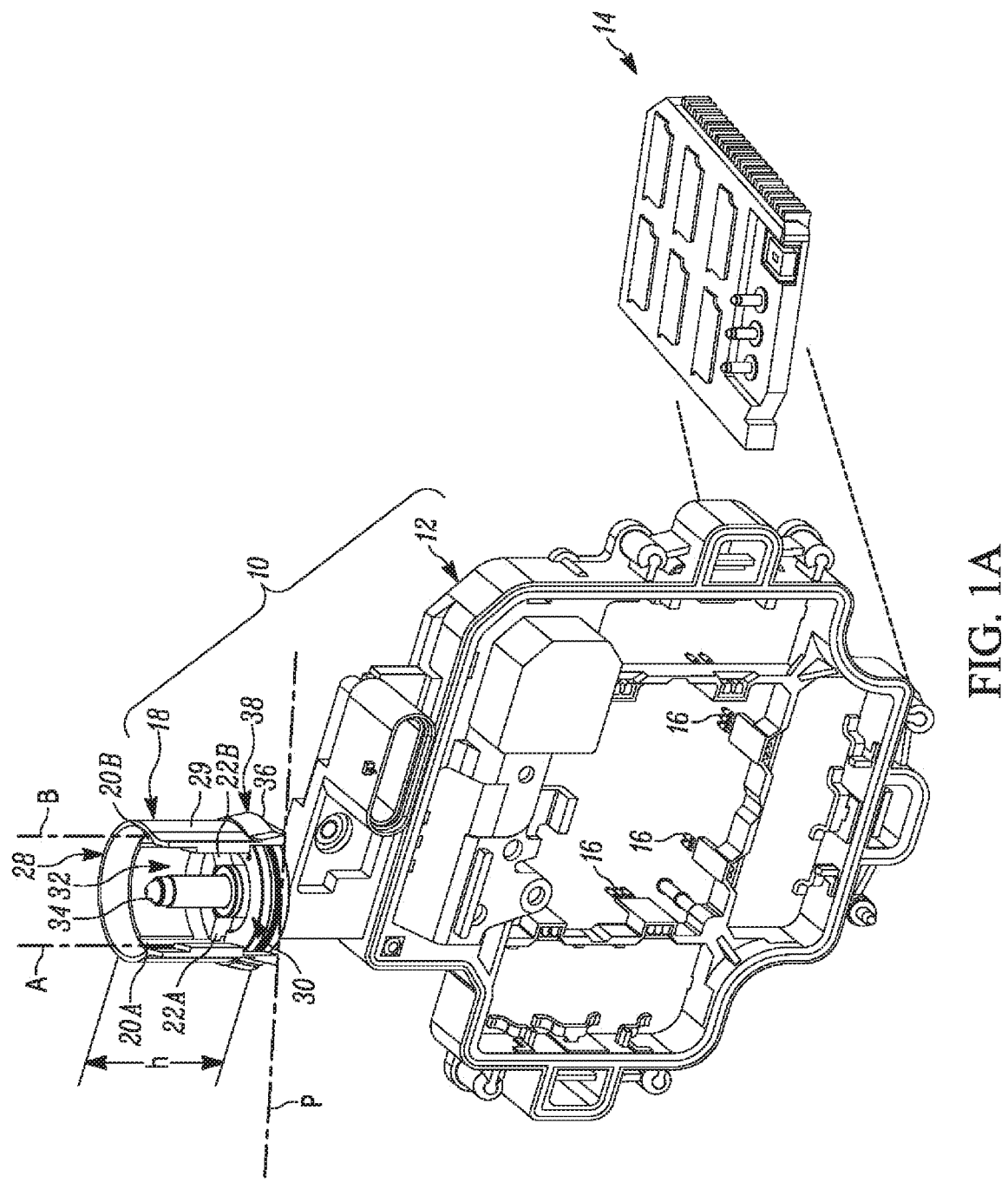
FIG. 1A is a partially exploded perspective view of a connector system in accordance with the principles of the present disclosure.

The following description is merely exemplary in nature and is not intended to limit the present disclosure, application, or uses.

Certain terms are used throughout the following description and claims to refer to particular system components and configurations. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ".

Examples of the disclosure are described below. It should be noted that these and other examples or implementations are exemplary and are intended to be illustrative of the disclosure rather than limiting. While the disclosure is widely applicable to different types of systems, it is impossible to include all of the possible examples and contexts of the disclosure in the description below. Upon reading this disclosure, many alternative examples of the present disclosure will be apparent to persons of ordinary skill in the art. Other examples may be utilized, and other changes may be made, without departing from the spirit or scope of the subject matter presented here.

With reference to FIGS. 1A-1G, a connector system for a hybrid motor vehicle is illustrated and generally designated at 10. The connector system 10 includes a leadframe 12 (which could also or alternatively be called a mainframe) configured to provide an electrical and mechanical connection between a power inverter 14 and a battery system (not shown) of an electric motor. The power inverter 14 may be, for example, a 48V DC/DC inverter for driving a motor useful in engine start-stop applications. In some examples, the power inverter 14 is combined together with the electric motor itself. The connector system 10 may also have a printed circuit board (PCB) (not shown) attached to the leadframe 12, for examples, at leads 16 for controlling the power inverter 14 and/or the battery system.

A shroud 18 is removably attached to the leadframe 12. The shroud 18 is configured to connect the leadframe 12 to the battery system (not shown). The shroud 18 has at least one shroud alignment feature 20A, 20B, and the leadframe 12 has at least one leadframe alignment feature 22A, 22B. The shroud 18 is removably attached to the leadframe 12 in a predetermined orientation where the at least one shroud alignment feature 20 is aligned with the at least one leadframe alignment feature 22.

In some examples, the shroud 18 has two shroud alignment features 20A, 20B in the form of slots. For examples, the two shroud alignment features include a first shroud alignment feature 20A and a second shroud alignment feature 20B. The leadframe 12 also has two alignment features 22, which are slots in this example. For example, the two alignment features 22 of the leadframe 12 include a first leadframe alignment feature 22A and a second leadframe alignment feature 22B. The first alignment feature 20A of the shroud 18 is disposed along a first line A, and the second alignment 20B of the shroud 18 is disposed along a second line B. Likewise, the first alignment feature 22A of the leadframe 12 is disposed along the first line A, and the second alignment feature 22B of the leadframe 12 is disposed along the second line B. The lines A, B (and thus the alignment features 20A, 20B, 22A, 22B) are disposed about the center C of the connector shroud 18, each having an angle α therebetween (see FIG. 1F). In some examples, the angle α is about 120 degrees. However, the angle α may be any angle separating two shroud alignment features 20A, 20B or two leadframe alignment features 22A, 22B.

Figure 1B:
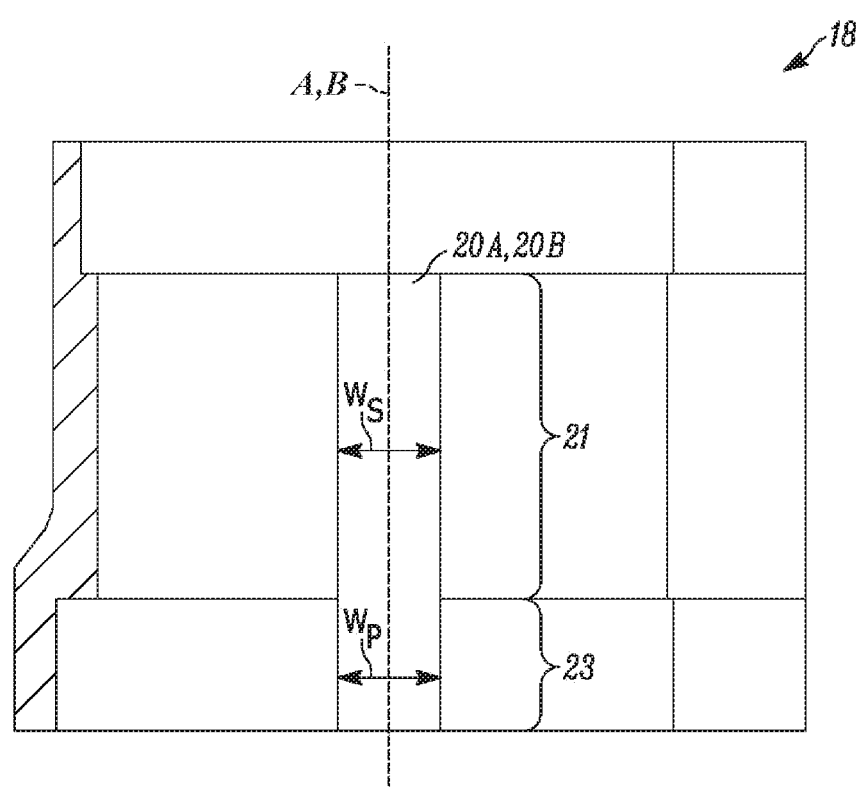
FIG. 1B is a cross-sectional view of a shroud of the connector system of FIG. 1A, according to the principles of the present disclosure.

Referring to FIG. 1B, in some implementations, the shroud alignment feature 20A, 20B includes a slot portion 21 and a protrusion portion 23. In some examples, the slot portion 21 has a width $w_s$ being the same as a width $w_p$ of the protrusion portion 23. As such, the slot portion 21 and the protrusion portion 23 are disposed along a line, e.g., the first line A or the second line B. The leadframe alignment feature 22 of the leadframe 12 is configured to receive the protrusion portion 23 of the shroud alignment feature 20.

Figure 1C:
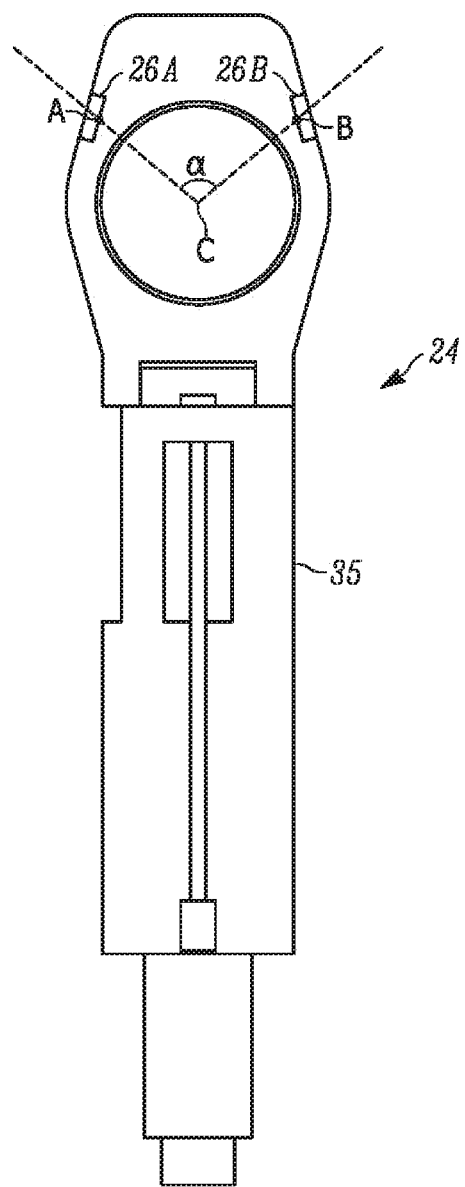
FIG. 1C is a plan view of a battery system connector for use with the connector system of FIG. 1A, according to the principles of the present disclosure.

A battery system connector 24, shown in FIG. 1C, is attached to the connector shroud 18 to connect the leadframe 12 and the power inverter 14 with the battery system. Like the shroud 18 and the leadframe 12, the battery system connector 24 also has at least one alignment feature 26A, 26B. As shown, the battery system connector includes a first alignment feature 26A and a second alignment feature 26B. Each of the battery system connector alignment features 26A, 26B is similarly disposed along the lines A, B (which extend out of the page in the orientation of FIG. 1C), and the battery system connector alignment features 26A, 26B disposed about the angle α apart from each other along a circle disposed about the center C of the shroud 18. In some examples, the angle α is about 120 degrees.

In the illustrated examples, the battery system connector alignment features 26A, 26B are in the form of protrusions that extend into the slots 20A, 20B, 22A, 22B of the shroud 18 and the leadframe 12. For example, the first battery system connector alignment feature 26A extends into the first shroud alignment feature slot 20A and the first leadframe alignment feature slot 22A when assembled, and the second battery system connector alignment feature 26B extends into the second shroud alignment feature slot 20B and the second leadframe alignment feature slot 22B when assembled. As such, the alignment feature protrusions 26A, 26B of the battery system connector 24 serve to hold the leadframe 12 and the shroud 18 into the aligned position.

Figure 1D:
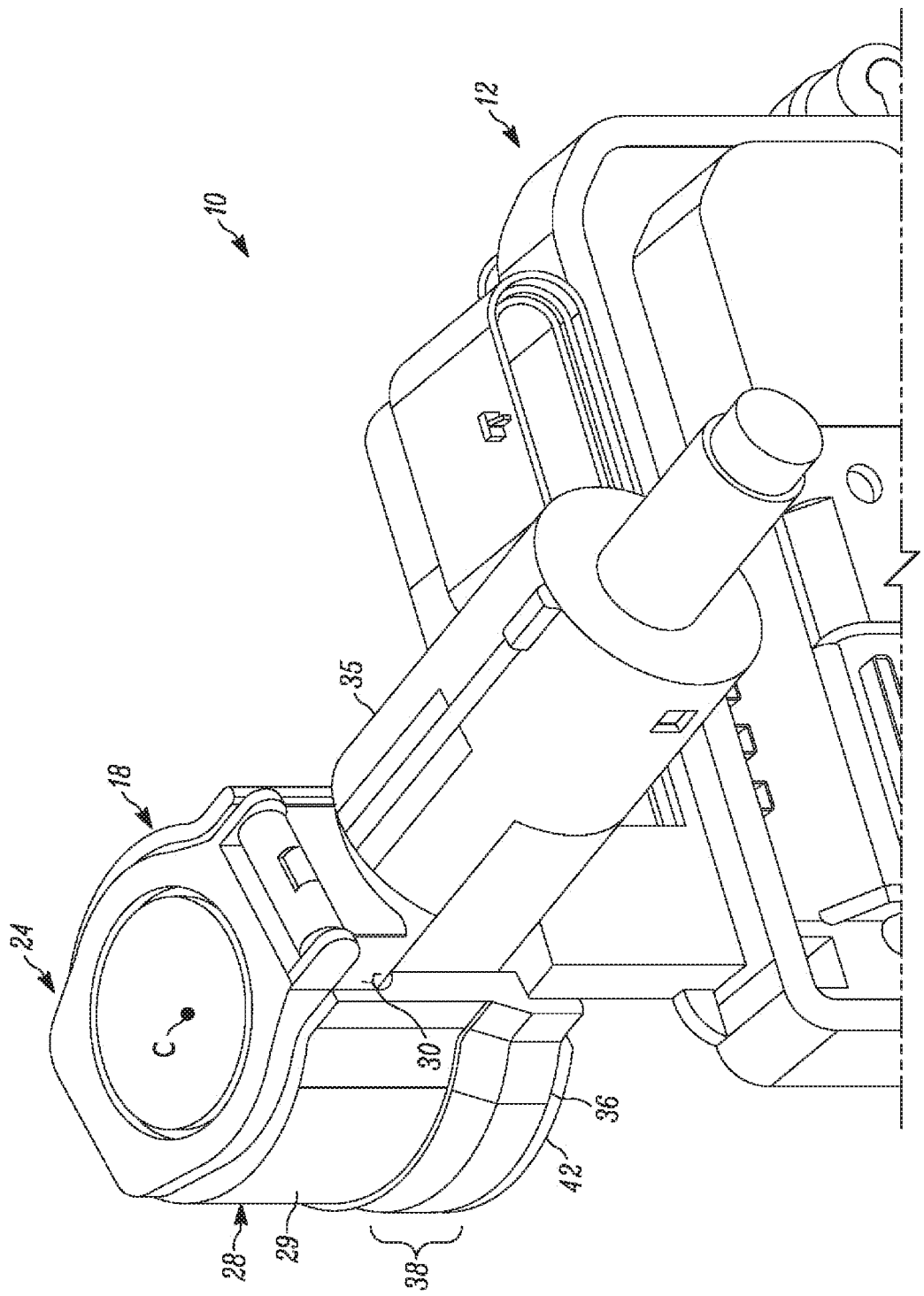
FIG. 1D is a perspective view of a portion of the connector system of FIG. 1A including the battery system connector of FIG. 1C, in accordance with the principles of the present disclosure.

Referring back to FIGS. 1A-1G, the connector shroud 18 has a hollow cylindrical portion 28 having a wall 29 that defines an opening 30 along a height h of the connector shroud 18. The wall 29 of the hollow cylindrical portion 28 defines a hollow interior space 32 within the wall 29. A bolt 34 (such as a fixation stud) extends from the leadframe 12 into the hollow interior space 32. The bolt 34 is then further connected to the battery system connector 24. The opening 30 allows a portion of a connector body 35 of the battery system connector 24 to extend out of the wall 29 through the side of the shroud 18 as shown in FIG. 1D.

The shroud 18 may be attached, such as by being removably attached, to the leadframe 12 in any suitable manner. In some examples, the shroud 18 is clipped to the leadframe 12. In this example, the wall 29 defines a base portion 36 disposed in a base portion plane P at one end 38 of the wall 29. One or more connecting features 40 (in this case, there are three connecting features 40) extend from the base portion 36 and out of the base portion plane P (beyond the base portion plane P). The connecting features 40, which are illustrated as tabs, serve to clip and attach the shroud 18 to a base 42 on the leadframe 12. The shroud 18 could be press fit to the base 42 on the leadframe 12 by pressing the shroud 18 over the base 42 until the connecting features 40 extend past the base 42 to positively engage the base 42.

Figure 1E:
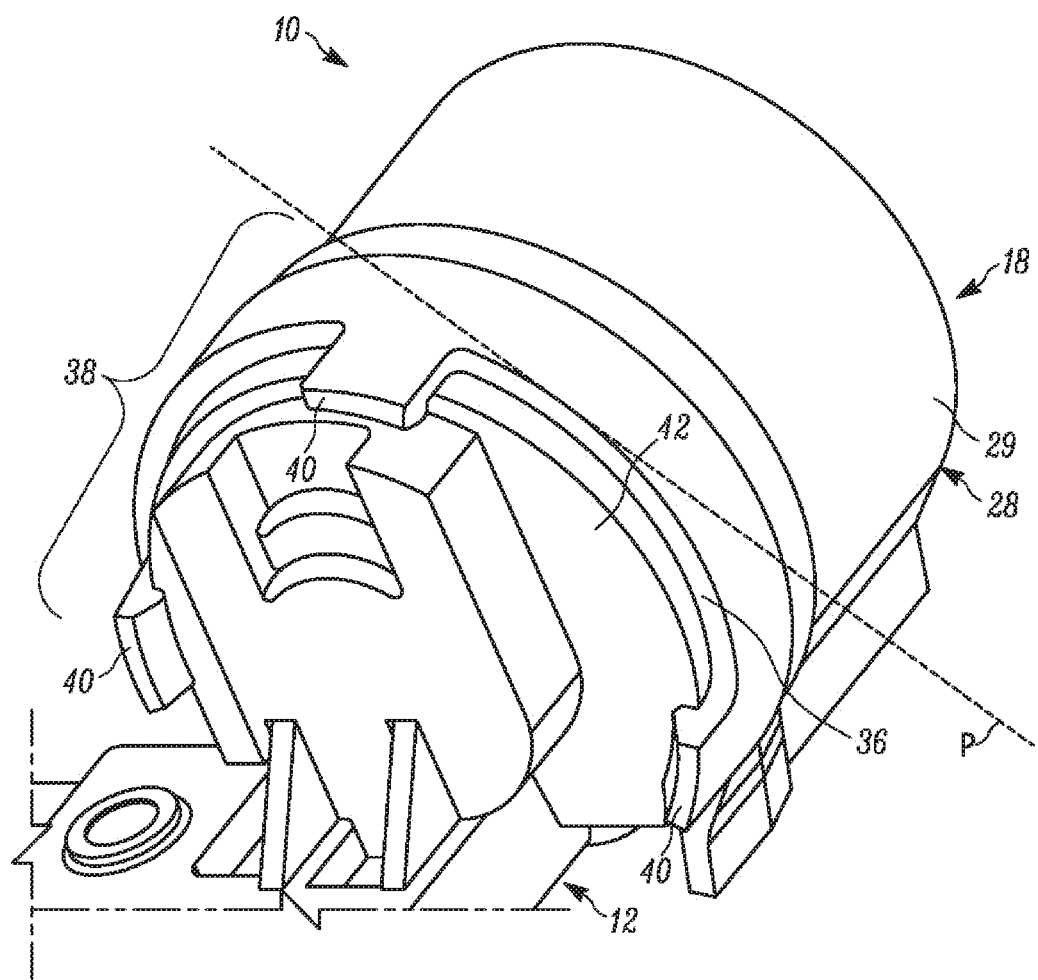
FIG. 1E is a bottom perspective view of a portion of the connector system of FIG. 1A, according to the principles of the present disclosure.
Figure 1F:
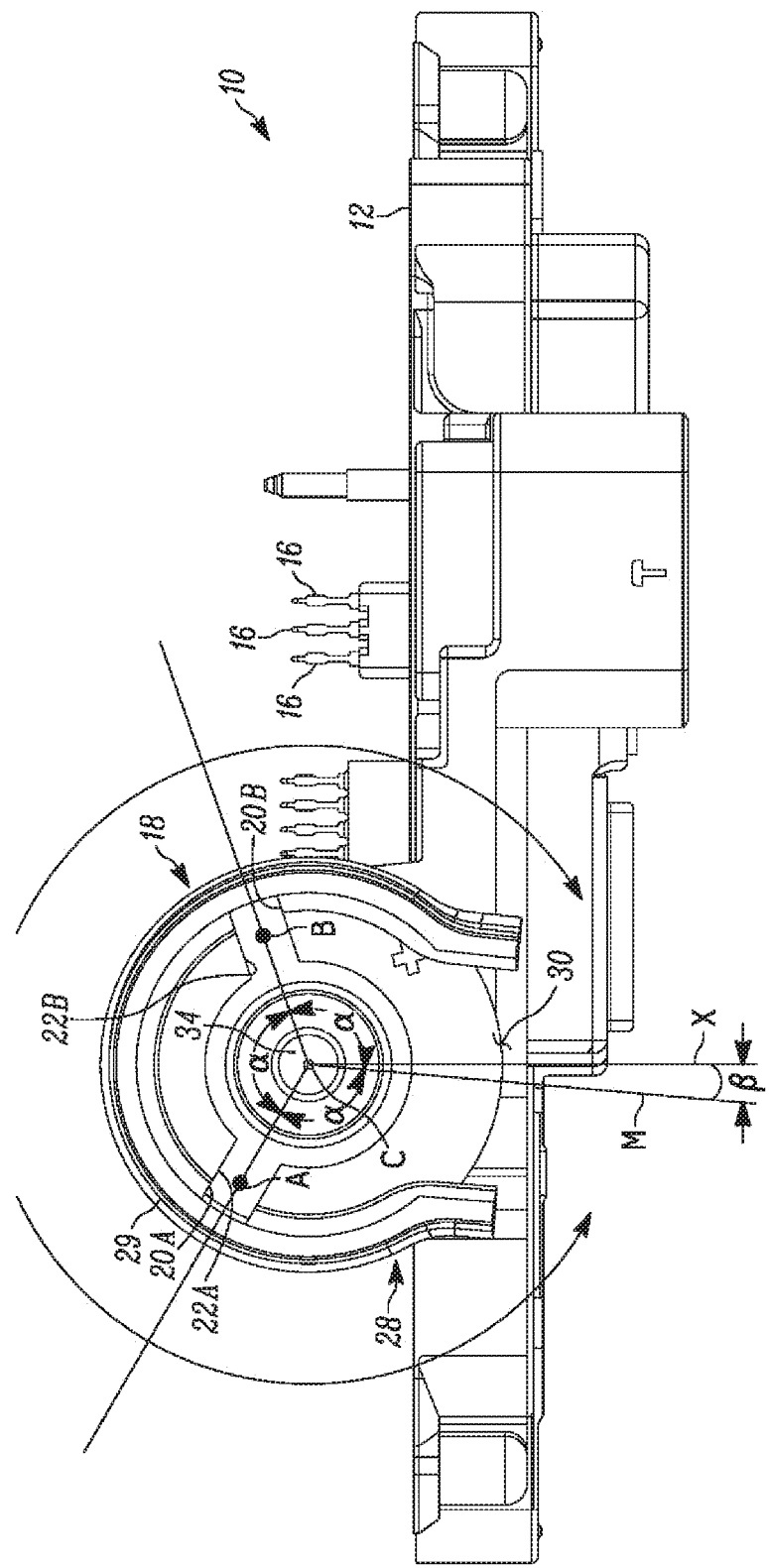
FIG. 1F is a plan view of the connector system of FIGS. 1A, 1D, and 1E, in accordance with the principles of the present disclosure.

Referring to FIG. 1F, the system 10 has been molded into a first configuration. In this first configuration, an insert in the tooling for the mold to create the leadframe 12 was oriented so that the opening 30, having center line M, is disposed an angle β from the axis X perpendicular to the plane of the leadframe 12. In other words, due to the particular configuration of the automobile for which the connector system 10 is to be used, it was desired to orient the connector body 35 at the angle β from the axis X perpendicular to the plane of the leadframe 12. Therefore, the insert was added to the mold tool so that the leadframe 12 had the alignment features 22A, 22B molded at the orientation shown in FIG. 1F, where each is oriented about the angle α (for example, the angle α being 120 degrees) from the center line M of the opening 30, and the center line M is oriented at the angle β from the axis X perpendicular to the plane of the leadframe 12. In some examples, the angle β is equal to about 5 degrees. It should be understood that while the alignment features are shown oriented at the α angles of about 120 degrees from the center line M of the side opening 30, it should be understood that the alignment features 20A, 20B, 22A, 22B could have any other desired spacing.

Figure 1G:
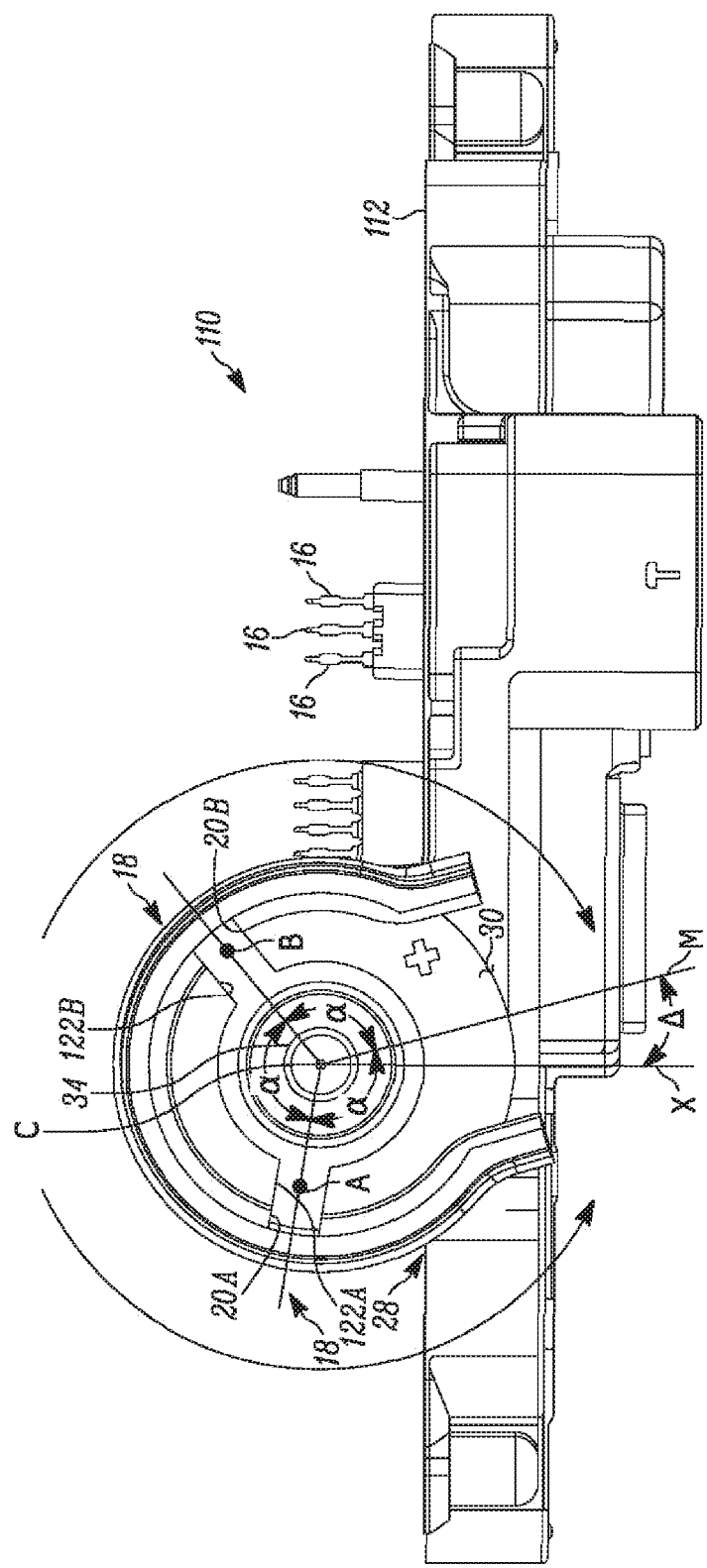
FIG. 1G is a plan view of another connector system according to the principles of the present disclosure.
Figure 1H:
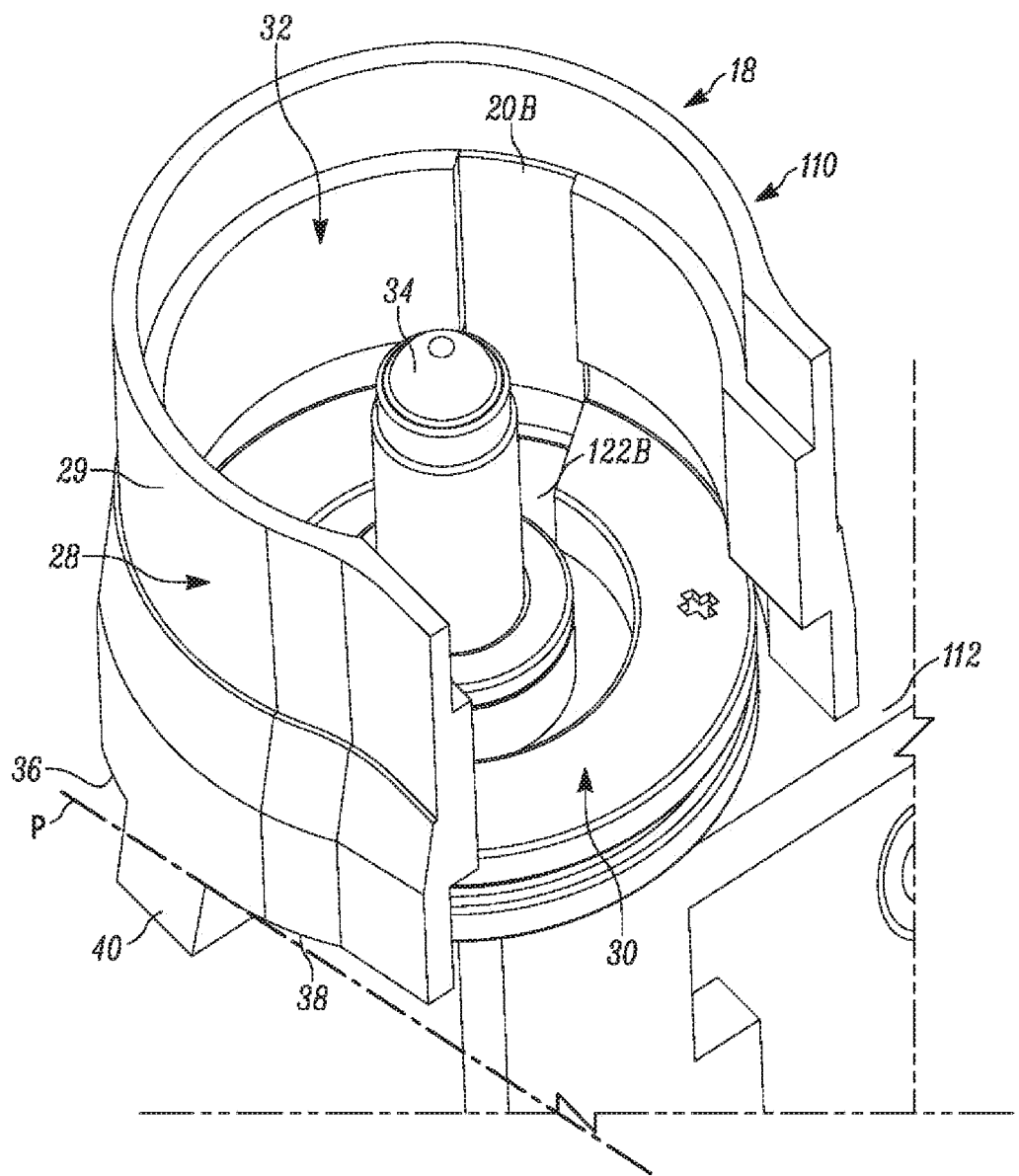
FIG. 1H is a perspective view of the connector system of FIG. 1G, in accordance with the principles of the present disclosure.

Referring now to FIGS. 1F and 1G, a similar connector system for a hybrid motor vehicle is illustrated and generally designated at 110. It should be understood that the connector system 110 has the same elements and features of the connector system 10 described above, unless called out as being different. Thus, only the differences between the connector systems 10, 110 will be described here. For example, the shroud 18 of the connector system 110 is exactly the same as the shroud 18 described above. The only difference in the system 110 is that the insert to the mold tool had been rotated before molding the leadframe 112, so that the alignment features 122A, 122B of the leadframe 112 are oriented at different angles with respect to the axis X perpendicular to the plane of the leadframe 112. The alignment features 122A, 122B are still oriented at the angle α with respect to each other and with respect to the center line M of the opening 30 of the shroud 18; however, in the example of FIGS. 1G and 1H, the center line M of the opening 30 is oriented at an angle Δ from the axis X that is perpendicular to the plane of the leadframe 12. As such, each of the alignment features 122A, 122B has been re-oriented with respect to the axis X in the example of FIGS. 1G and 1H, in comparison to the orientation of the leadframe alignment features 22A, 22B illustrated in FIG. 1F. Only the alignment features 122A, 122B have been moved, but this allows the shroud 18 to be realigned with respect to the leadframe 12 so that the opening 30 will face a different direction, and accordingly, the connector body 35 will extend in a different direction than the orientation of FIGS. 1A-1E. In this example, the angle Δ is equal to about 15 degrees; however, the angle Δ may have other values.

It should be understood that the angle between the axis X perpendicular to the plane of the leadframe 12, 112 and the center line M of the opening 30 in the shroud 18 can now be easily reconfigured by simply moving an insert within the molding tool used to make the alignment features 22A, 22B, 122A, 122B of the leadframe 12, 112 in any desired orientation about the central axis C running through the bolt 34. Accordingly, the entire tool for the leadframe 12, 112 does not need to be remade in order to re-orient the opening 30 in the shroud 18 and the connector body 35 of the battery system connector 24.

As one having ordinary skill in the art would understand, the shroud 18 can be rotated 360 degrees about the base 42 of the leadframe 12, 112 to obtain any desired orientation of the opening 30 in the shroud 18 with respect to the plane of the leadframe 12, 112. The alignment features 22A, 22B, 122A, 122B of the leadframe 12, 112 could simply be rearranged as explained above to accommodate different orientations.

Figure 2A:
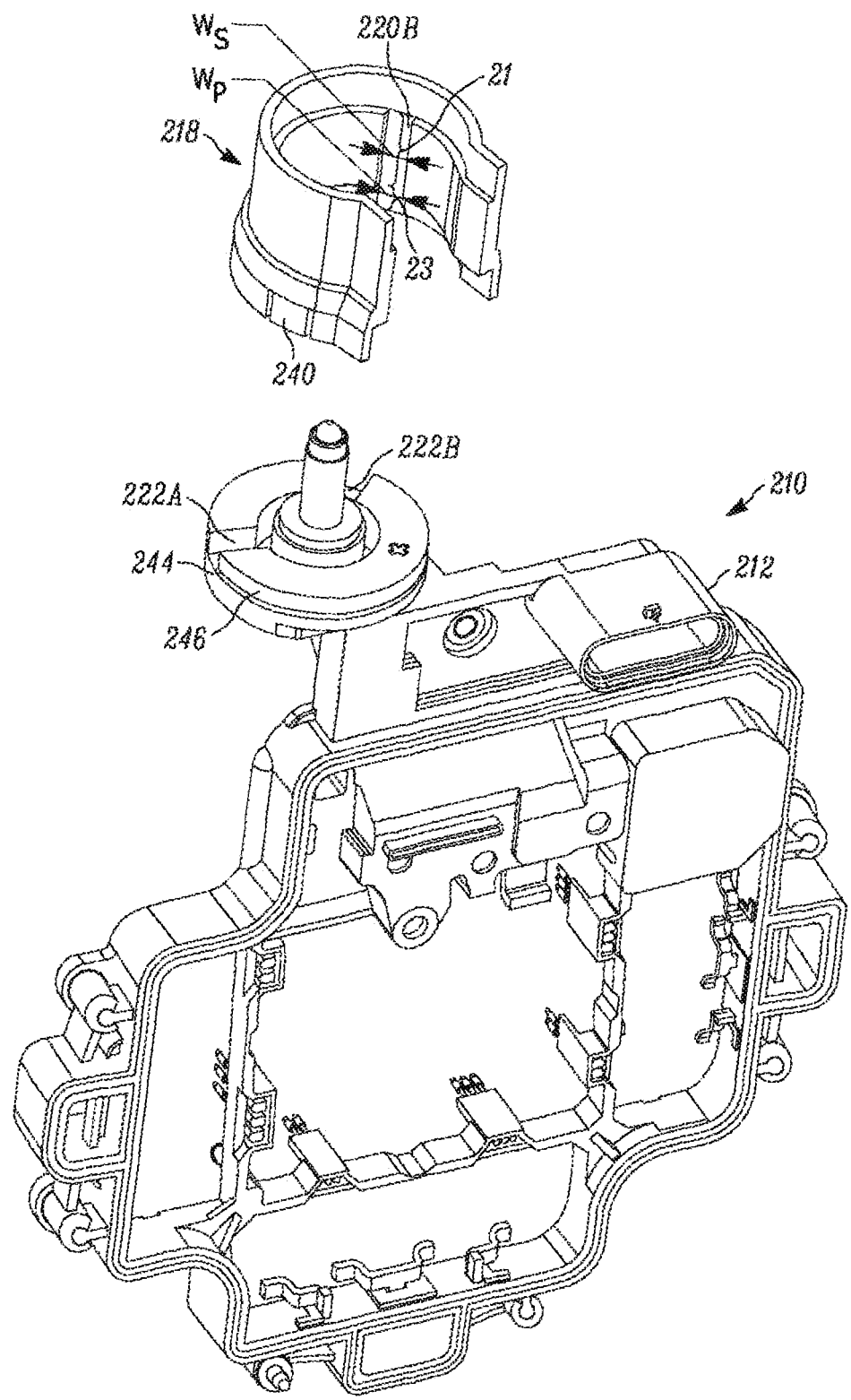
FIG. 2A is an exploded perspective view of yet another connector system according to the principles of the present disclosure.
Figure 2B:
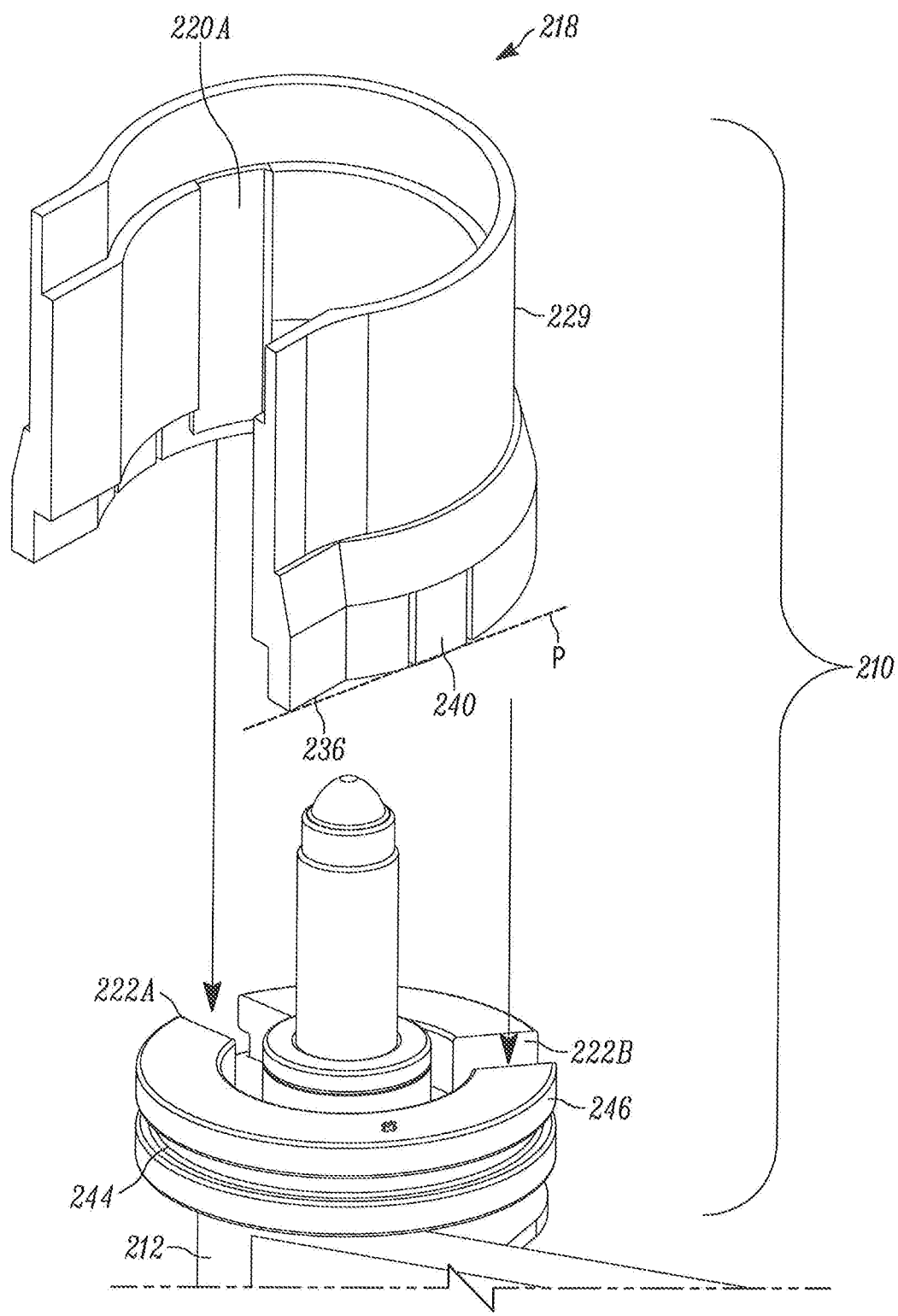
FIG. 2B is an exploded perspective view of a portion of the connector system of FIG. 2A, in accordance with the principles of the present disclosure.
Figure 2C:
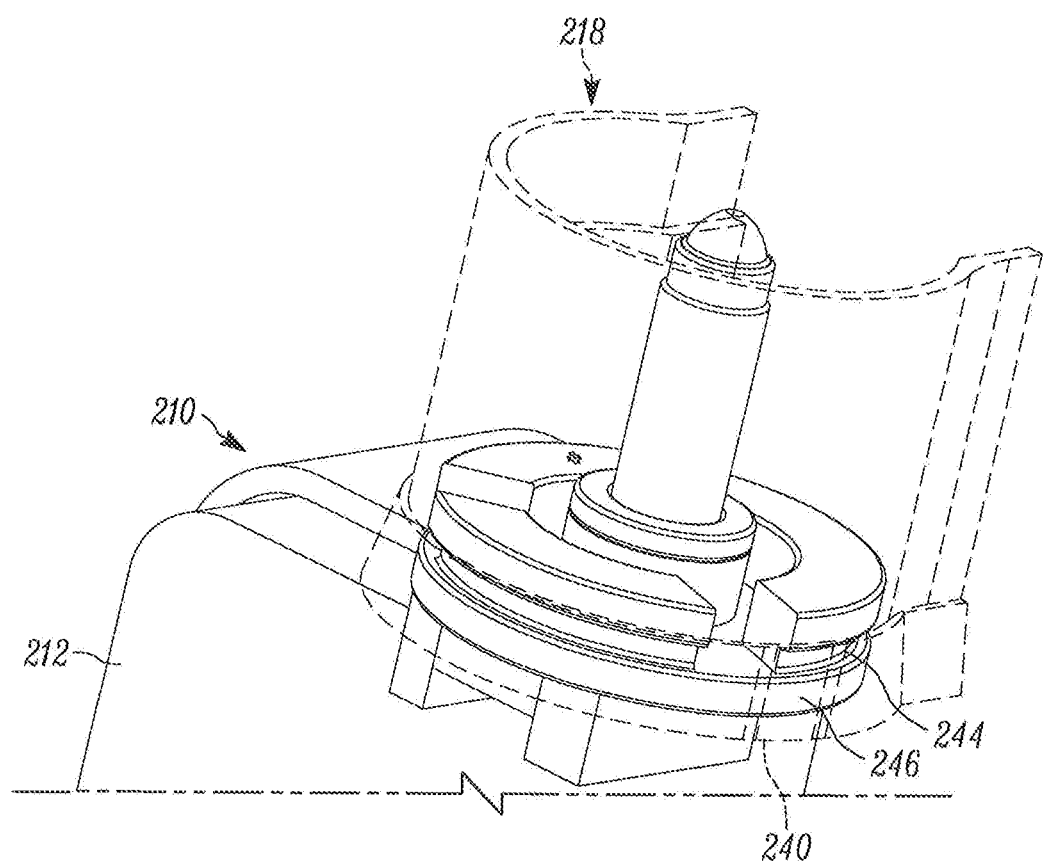
FIG. 2C is a perspective view of a portion of the connector system of FIGS. 2A and 2B, according to the principles of the present disclosure.

Referring now to FIGS. 2A-2C, another variation of a connector system is illustrated and generally designated at 210. Again, it should be understood that the connector system 210 is very similar to the connector systems 10, 110 described above and should be understood to be the same unless described as being different.

The main difference between the connector system 210 illustrated in FIGS. 2A-2C is that the connecting features 240 of the shroud 218 do not clip under a base 42 on the leadframe 212 (as shown in FIG. 1E); rather the connecting features 240 clip into a groove 244 in a frame 246 on the leadframe 212. In this example, the connecting features 240 do not extend out of the plane of the base portion 236 of the wall 229 of the shroud 218. The shroud 218 could be press fit to the frame 246 on the leadframe 212 by pressing the shroud 218 over the frame 246 until the connecting features 240 (which are in the form of tabs) engage the groove 244 in the frame 246.

In all other ways, the leadframe 212 and shroud 218 should be understood to be similar to the leadframes 112 and shroud 18 described above. For example, the orientation of the leadframe alignment features 222A, 222B illustrated in FIGS. 2A-2C can be moved by retooling the mold for the leadframe 212, but the connector shroud 218 remains the same even through the minor retooling of the mold for the leadframe 212 with the shroud alignment features 220A, 220B remaining with the orientation illustrated.

Figure 3:
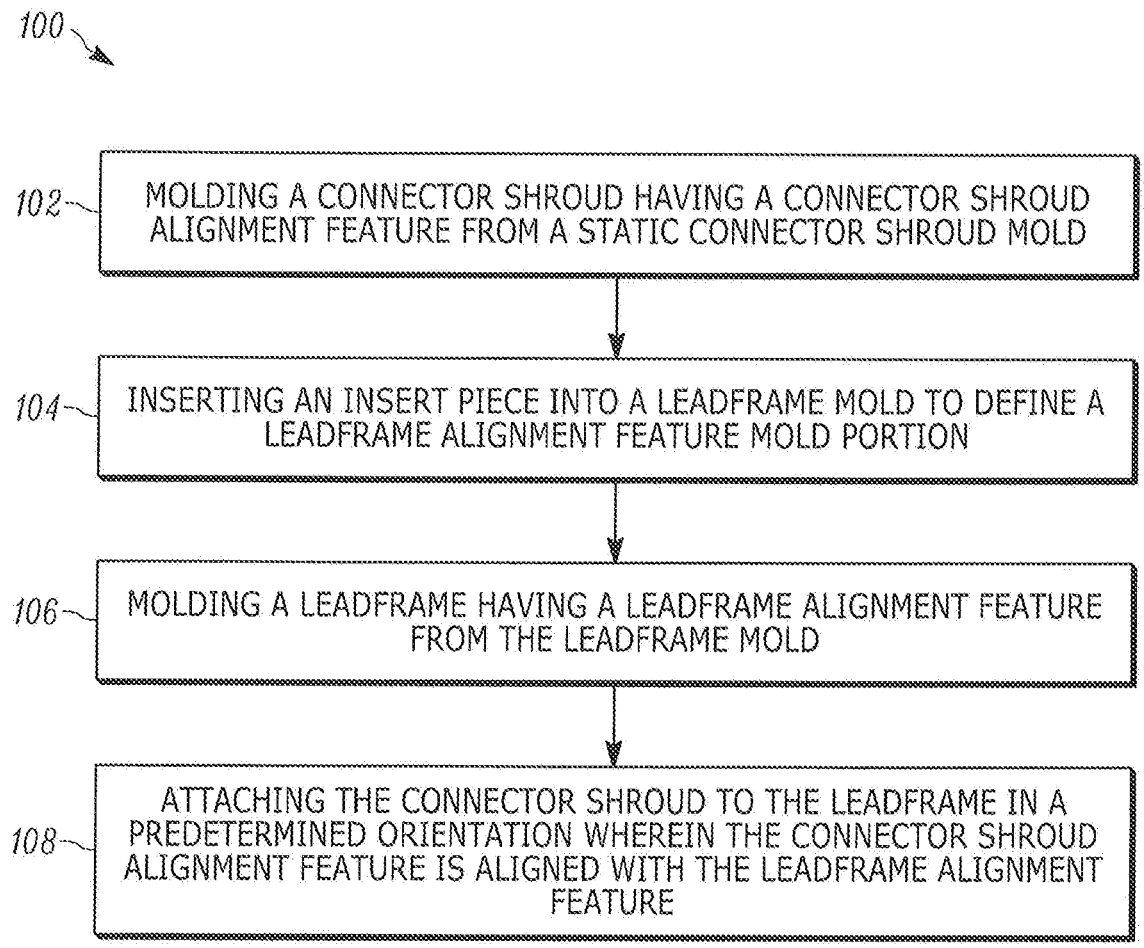
FIG. 3 is a block diagram illustrating a method of forming a connector system for a hybrid motor vehicle, according to the principles of the present disclosure.

Referring now to FIG. 3, a method 300 of forming a connector system 10, 110, 210 for a hybrid motor vehicle is illustrated and generally designated at 300. The method includes a step 302 of molding a connector shroud 18, 218 having a connector shroud alignment feature 20A, 20B, 220A, 220B from a static connector shroud mold. As described above, the mold for the shroud 18, 218 is unchanging and does not necessarily need retooling or other changes to accommodate vehicles having various interior landscapes. The method 300, however, includes a step 304 of inserting an insert piece into a leadframe mold to define a leadframe alignment feature mold portion. This is the only mold feature where a change is needed in order to change the direction that the connector body 35 will extend from the shroud 18, 218. The insert may be rotated and attached to the leadframe mold in the desired orientation.

Further, the method 300 includes a step 306 of molding a leadframe 12, 112, 212 having a leadframe alignment feature from the leadframe mold. The leadframe alignment feature 22A, 22B, 122A, 122B, 222A, 222B will have the orientation established by the orientation of the insert within the leadframe mold. The method 300 then includes a step 308 of attaching the connector shroud 18, 218 to the leadframe 12, 112, 212 in a predetermined orientation where the connector shroud alignment feature 20A, 20B, 220A, 220B from is aligned with the leadframe alignment feature 22A, 22B, 122A, 122B, 222A, 222B. An example of such alignment is described above.

In some variations, the method 300 could also include steps of forming the connector shroud 18, 218 having at least one connecting feature 40 (as described above), and attaching the connecting feature 40 to the leadframe 12, 112, 212.

It is further understood that any of the above described concepts can be used alone or in combination with any or all of the other above described concepts. As a person skilled in the art will readily appreciate, the above description is meant as one illustration of the principles of the disclosure. This description is not intended to limit the scope or application of the disclosure in that the disclosure is susceptible to modification, variation, and change, without departing from the spirit and scope of the disclosure, as defined in the following claims.

What is claimed is:

1. A shroud configured to connect a leadframe to a battery system of an electrical motor, the shroud being removably attachable to the leadframe, the shroud comprising:
    a hollow cylindrical portion, the hollow cylindrical portion defines an opening along a height of the hollow cylindrical portion;
    at least one shroud alignment feature configured to align the shroud with the leadframe in a predetermined orientation, the at least one shroud alignment feature comprising two slots configured to be aligned with slots of the leadframe, a first slot of the two slots disposed along a first line and a second slot of the two slots being disposed along a second line, the first and second lines having an angle of about 120 degrees therebetween as measured from a center of the shroud; and
    at least one connecting feature configured to attach the shroud to the leadframe.

2. The shroud of claim 1, wherein the hollow cylindrical portion has a base portion disposed in a base portion plane, the at least one connecting feature comprising a plurality of connecting features extending from the base portion and beyond the base portion plane.

3. The shroud of claim 2, wherein the shroud is press fit to the leadframe.

4. The shroud of claim 2, wherein the shroud is clipped to the leadframe.

* * * * *